United States Patent
Kim et al.

(10) Patent No.: US 9,425,880 B2
(45) Date of Patent: Aug. 23, 2016

(54) APPARATUS AND METHOD FOR TRANSMITTING SIGNAL IN A WIRELESS COMMUNICATION SYSTEM

(71) Applicant: Samsung Electronics Co., Ltd., Gyeonggi-do (KR)

(72) Inventors: Tae-Young Kim, Gyeonggi-do (KR); Jeong-Ho Park, Seoul (KR); Ji-Yun Seol, Gyeonggi-do (KR); Hyun-Kyu Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/365,984

(22) PCT Filed: Dec. 17, 2012

(86) PCT No.: PCT/KR2012/010991
§ 371 (c)(1),
(2) Date: Jun. 16, 2014

(87) PCT Pub. No.: WO2013/089525
PCT Pub. Date: Jun. 20, 2013

(65) Prior Publication Data
US 2015/0010105 A1 Jan. 8, 2015

(30) Foreign Application Priority Data

Dec. 16, 2011 (KR) .................. 10-2011-0136283

(51) Int. Cl.
*H04B 15/00* (2006.01)
*H04B 7/06* (2006.01)
(Continued)

(52) U.S. Cl.
CPC ............ *H04B 7/0617* (2013.01); *H04L 27/261* (2013.01); *H04L 27/2628* (2013.01); *H04B 7/086* (2013.01); *H04L 5/0023* (2013.01); *H04L 5/0044* (2013.01); *H04L 5/0048* (2013.01)

(58) Field of Classification Search
CPC .............. H03F 1/3247; H03F 1/3294; H03F 2201/3233; H04L 27/368; H04L 25/03343
USPC ............... 375/224–236, 259–285, 295–352
See application file for complete search history.

(56) References Cited

U.S. PATENT DOCUMENTS 8,027,367 B2 * 9/2011 Li .................... H04L 1/0026
370/330
2005/0249174 A1 11/2005 Lundby et al.
(Continued)

FOREIGN PATENT DOCUMENTS

CN 101542937 9/2009
EP 1 916 856 A1 4/2008
(Continued)

OTHER PUBLICATIONS

International Search Report dated Mar. 28, 2013 in connection with International Patent Application No. PCT/KR2012/010991, 4 pages.
(Continued)

*Primary Examiner* — James M Perez

(57) ABSTRACT

An apparatus and method for transmitting a signal needed for beam acquisition in a wireless communication system operating in a super-high frequency band are provided, in which a small reference modulation symbol length relative to a data modulation symbol length is determined, taking into account a communication characteristic of a Mobile Station (MS), a data modulation symbol generated by modulating a data signal using a predetermined modulation scheme is transmitted according to the determined data modulation symbol length, and a reference modulation symbol generated by modulating a reference signal using the predetermined modulation scheme is transmitted according to the determined reference modulation symbol length.

22 Claims, 3 Drawing Sheets

(51) Int. Cl.
  *H04L 27/26* (2006.01)
  *H04L 5/00* (2006.01)
  *H04B 7/08* (2006.01)

(56) References Cited

U.S. PATENT DOCUMENTS

| | | | |
|---|---|---|---|
| 2006/0020389 A1 | 1/2006 | Yamamoto | |
| 2006/0203891 A1 | 9/2006 | Sampath et al. | |
| 2006/0209732 A1* | 9/2006 | Gorokhov | H04B 1/715 370/310 |
| 2008/0165891 A1* | 7/2008 | Budianu | H04L 25/0202 375/299 |
| 2008/0171516 A1* | 7/2008 | Kakura | H04B 7/086 455/63.4 |
| 2009/0215401 A1 | 8/2009 | Yoon et al. | |
| 2009/0290657 A1 | 11/2009 | Howard et al. | |
| 2010/0150056 A1* | 6/2010 | Iwai | H04L 5/023 370/328 |
| 2010/0165914 A1* | 7/2010 | Cho | H04B 7/0695 370/328 |
| 2010/0265924 A1 | 10/2010 | Yong et al. | |
| 2010/0279628 A1* | 11/2010 | Love | H04L 5/0091 455/70 |
| 2011/0064033 A1 | 3/2011 | Gong et al. | |
| 2012/0087394 A1* | 4/2012 | Ma | H04B 7/0678 375/146 |

FOREIGN PATENT DOCUMENTS

| | | |
|---|---|---|
| KR | 10-2005-0027186 | 3/2005 |
| KR | 10-2007-0011585 | 1/2007 |
| KR | 10-2009-0085405 | 8/2009 |
| KR | 10-2010-0134109 | 12/2010 |
| WO | WO 2009/041759 A1 | 4/2009 |

OTHER PUBLICATIONS

Written Opinion of International Searching Authority dated Mar. 28, 2013 in connection with International Patent Application No. PCT/KR2012/010991, 4 pages.
Extended European Search Report dated Nov. 23, 2015 in connection with European Patent Application No. 12857232.8, 6 pages.
Chinese Office Action issued for CN 201280062206.6 dated Jun. 21, 2016, 15 pgs.

\* cited by examiner

APPARATUS AND METHOD FOR TRANSMITTING SIGNAL IN A WIRELESS COMMUNICATION SYSTEM

CROSS-REFERENCE TO RELATED APPLICATION(S)

The present application claims priority under 35 U.S.C. §365 to International Patent Application No. PCT/KR2012/010991 filed Dec. 17, 2012, entitled "APPARATUS AND METHOD FOR TRANSMITTING SIGNAL IN A WIRELESS COMMUNICATION SYSTEM". International Patent Application No. PCT/KR2012/10991 claims priority under 35 U.S.C. §365 and/or 35 U.S.C. §119(a) to Korean Patent Application No. 10-2011-0136283 filed Dec. 16, 2011 and which are incorporated herein by reference into the present disclosure as if fully set forth herein.

TECHNICAL FIELD

The present invention relates to an apparatus and method for transmitting a signal in a wireless communication system, and more particularly, to an apparatus and method for transmitting a signal needed for beam acquisition in a wireless communication system operating in a super-high frequency band.

BACKGROUND ART

To satisfy ever-increasing demands for data traffic, wireless communication systems have been developed to support higher data rates.

The tendency of the technological development of $4^{th}$ Generation (4G) systems so far proposed is toward improvement of spectral frequency to increase data rate. However, it is difficult to satisfy soaring demands for data traffic simply through improved spectral efficiency.

One of techniques proposed to solve this problem is to use a very broad frequency band. However, it is very difficult to secure a broad frequency band in a cellular system operating at or below 5 GHz, which is a major example of wireless communication systems. Accordingly, it is necessary to secure a broadband frequency in a frequency band higher than that of the cellular system.

As a higher transmission frequency is used for wireless communication, propagation path loss increases. The resulting relative short propagation distance leads to reduction of service coverage. In this context, beamforming has been proposed as one of important techniques for mitigating propagation path loss and increasing a propagation distance.

A kind of beamforming, namely transmission beamforming is a scheme of steering a signal from each of a plurality of antennas in a specific direction. A set of such antennas is called an 'antenna array' and an antenna of the antenna array is called an 'antenna element'.

In general, the propagation distance of a signal can be increased by transmission beamforming. Furthermore, transmission beamforming can reduce interference with other users because a signal is almost not transmitted in directions other than an intended direction.

A receiver may also perform reception beamforming using a reception antenna array. Reception beamforming can also increase the sensitivity of a signal received from a specific direction by focusing on wave reception from the specific direction and can eliminate interference by excluding signals from other directions from the received signal.

As a transmission frequency increases, the wavelength of a signal wave decreases. Accordingly, antennas may be configured at a half-wavelength interval in the antenna array. In this case, the antenna array may be formed with more antennas over the same area. That is, a communication system operating in a high frequency band can obtain a high antenna gain by beamforming, relative to beamforming in a low frequency band. Therefore, a communication system operating in a high frequency band is suitable for beamforming.

That's why the communication system operating in a high frequency band uses beamforming in order to mitigate great propagation path loss. Beamforming should apply to data and control signals without distinction.

Conventionally, beamforming in Institute of Electrical and Electronics Engineers (IEEE) 802.11ad involves Sector Level Sweep (SLS) and Beam Refinement Protocol (BRP).

The IEEE 802.11ad standard is a Wireless Local Area Network (WLAN)-based technology that provides a very small service area with a radius between 10 m and 20 m in a 60-GHz super-high frequency band. Especially to solve a propagation property problem encountered with a super-high frequency band, the IEEE 802.11ad standard recommends beamforming.

In the SLS scheme defined in IEEE 802.11ad, a STAtion (STA) which will perform beamforming transmits the same sector frame repeatedly in a plurality of directions. Then a peer STA receives each sector frame using a quasi-omni antenna and transmits a feedback regarding the direction that offers the best sensitivity. The STA may acquire information about the best direction from the peer STA and perform beamforming in the best direction.

In the BRP scheme defined in IEEE 802.11ad, after beamforming in the SLS scheme, the direction of a transmission and reception beam is subjected to fine adjustment in order to increase a transmission and reception beamforming gain.

Typically, after two STAs detect the best transmission beam by the SLS scheme, they use the BRP scheme to detect a reception beam most suitable for the transmission beam. In addition, a combination of the transmission and reception beam directions is finely adjusted.

Especially a communication system operating in a super-high frequency band (hereinafter, referred to as a 'millimeter wave communication system') will adopt beamforming to mitigate propagation path loss and increase a propagation distance, in view of wireless communication in the super-high frequency band.

To maximize an antenna gain by beamforming, the millimeter wave communication system should be able to select the best transmission/reception beam. For example, it may use the SLS and BRP schemes as proposed by IEEE 802.11ad to select the best transmission/reception beam.

For example, as many reference signals as the number of transmission-reception beam combinations are transmitted repeatedly to select the best transmission/reception beam. Each reference signal is transmitted and received in a specific transmission/reception beam and the best transmission-reception beam combination is selected by comparing the strengths of the received signals.

If narrower beams are used to obtain a higher antenna gain, the number of transmission/reception beams is increased. The resulting linear increase in the number of necessary reference signals increases overall system overhead and thus decreases total system capacity. Accordingly, there exists a pressing need for developing a method for minimizing the system overhead of reference signals required for selecting a transmission/reception beam, when beamforming is used in a millimeter wave communication system.

DISCLOSURE OF INVENTION

Technical Problem

An aspect of embodiments of the present invention is to address at least the problems and/or disadvantages and to provide at least the advantages described below. Accordingly, an aspect of embodiments of the present invention is to provide a reference signal transmission apparatus and method for configuring reference signals in a manner that reduces the overhead of reference signals required for beam acquisition in a millimeter wave communication system.

Another aspect of embodiments of the present invention is to provide a signal transmission apparatus and method for setting different reference modulation symbol lengths for different Base Stations (BSs) or different users, taking into account the communication characteristics of user terminals in a millimeter wave communication system.

Another aspect of embodiments of the present invention is to provide a signal transmission apparatus and method for setting an Inverse Fast Fourier Transform (IFFT) size for Orthogonal Frequency Division Multiplexing (OFDM) modulation, taking into account the communication characteristics of user terminals at a BS in a millimeter wave communication system.

Another aspect of embodiments of the present invention is to provide a signal transmission apparatus and method for setting a beam width for beamforming, taking into account the communication characteristics of user terminals in a millimeter wave communication system.

A further aspect of embodiments of the present invention is to provide a signal transmission apparatus and method for setting different reference modulation symbol lengths for different user terminals according to the velocities of the user terminals in a millimeter wave communication system.

Solution to Problem

In accordance with an embodiment of the present invention, there is provided a method for transmitting a signal at a transmission apparatus in a wireless communication system supporting communication in a super-high frequency band, in which a small reference modulation symbol length relative to a data modulation symbol length is determined, taking into account a communication characteristic of a Mobile Station (MS), a data modulation symbol generated by modulating a data signal using a predetermined modulation scheme is transmitted according to the determined data modulation symbol length, and a reference modulation symbol generated by modulating a reference signal using the predetermined modulation scheme is transmitted according to the determined reference modulation symbol length.

In accordance with another embodiment of the present invention, there is provided a transmission apparatus for transmitting a signal in a wireless communication system supporting communication in a super-high frequency band, in which a first modulator generates a data modulation symbol by modulating a data signal using a predetermined modulation scheme, according to a data modulation symbol length determined based on a communication characteristics of an MS, a second modulator generates a reference modulation symbol by modulating a reference signal using the predetermined modulation scheme, according to a small reference modulation symbol length relative to the data modulation symbol length, determined based on the communication characteristics of the MS, a signal selector selectively outputs a data modulation symbol or a reference modulation symbol from a data modulation symbol sequence received from the first modulator or a reference modulation symbol sequence received from the second modulator, to generate a frame having a structure determined based on the communication characteristic of the MS, and a transmitter converts the data modulation symbol or the reference modulation symbol received from the signal selector to an analog signal and transmits the analog signal through an antenna array by beamforming.

Advantageous Effects of Invention

According to the embodiments of the present invention, the number of reference modulation symbols to be transmitted is adjusted within a data modulation symbol length, taking into account a communication environment. Therefore, an antenna gain attributed to beamforming can be increased and overall system overhead can be reduced.

Other various effects will be disclosed explicitly or implicitly in the following detailed description of the embodiments of the present invention.

BRIEF DESCRIPTION OF DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

MODE FOR THE INVENTION

Figure 1:
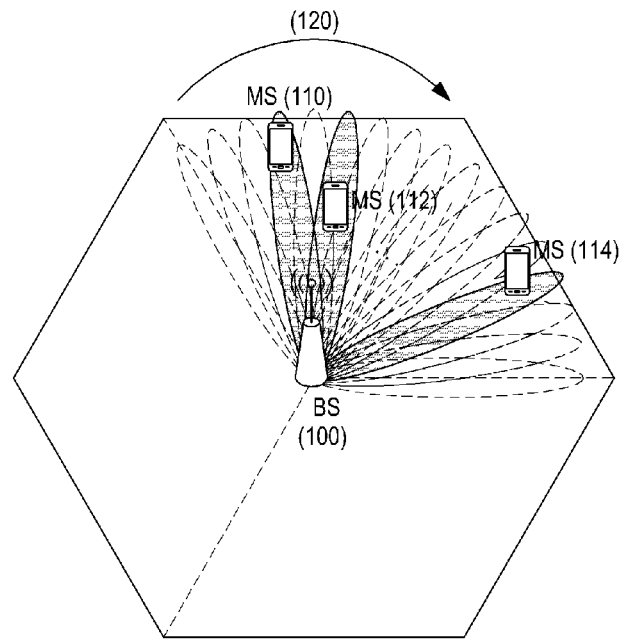
FIG. 1 illustrates the concept of reference signal transmission in a beam selection procedure in a millimeter wave communication system according to an embodiment of the present invention.

Reference will be made to preferred embodiments of the present invention with reference to the attached drawings. A detailed description of a generally known function and structure of the present invention will be avoided lest it should obscure the subject matter of the present invention. The terms used in the present invention are defined, taking into account functions in the present invention and may be changed according to the intention of a user or an operator, or customs. Therefore, the present invention must be understood, not simply by the actual terms used but by the meanings of each term lying within.

In embodiments of the present invention as described later, a frame is configured in such a manner that a transmission apparatus may transmit a data signal and a reference signal according to a specific symbol selection condition in a millimeter wave communication system. To configure the frame, a 'data signal transmission period' for transmitting a data signal and a 'reference signal transmission period' for transmitting a reference signal are defined in the frame.

When the data signal transmission period is defined, the length of an OFDM symbol determined for data signal transmission (hereinafter, referred to as a 'data OFDM symbol') according to a predetermined symbol selection condition is considered. When the reference signal transmission period is defined, the length of an OFDM symbol determined for reference signal transmission (hereinafter, referred to as a 'reference OFDM symbol') according to the predetermined symbol selection condition is considered. The lengths of a data OFDM symbol and a reference OFDM symbol are set to be different. Preferably, the data OFDM symbol length is larger than the reference OFDM symbol length. That is, the data OFDM symbol length and the reference OFDM symbol length are determined so that a plurality of reference OFDM symbols each having the reference OFDM symbol length may be transmitted within the data OFDM symbol length.

The predetermined symbol selection condition used to determine the data OFDM symbol length and the reference OFDM symbol length reflects the communication characteristics of a user terminal to be connected to a Base Station (BS) or cell. The communication characteristics of the user terminal can be predicted from the ambient environment of the BS or the user terminal.

That is, the communication characteristics of the user terminal connected to the BS may be predicted, taking into account locations and topography in the environment in which the BS is installed, or taking into account the location of the user terminal in the service coverage of the BS.

For example, if a first BS is installed in a commercial district populated with restaurants, coffee shops, etc., the first BS may predict that most of user terminals connected to the first BS are highly likely to be stationary or move slowly. On the other hand, if a second BS is installed in the vicinity of a highway and general road, or a railroad, the second BS may predict that most of user terminals connected to the second BS are highly likely to move fast.

Accordingly, the first and second BSs will determine different data OFDM symbol lengths $T_s$ and reference OFDM symbol lengths $t_s$, taking into account the above-described communication characteristics of user terminals. That is, the reference OFDM symbol lengths $t_s$ are set to be smaller than the data OFDM symbol lengths $T_s$. The data OFDM symbol lengths determined by the first and second BSs may be equal. However, the first and second BSs may set different reference OFDM symbol lengths. For example, the reference OFDM symbol length determined by the first BS may be smaller than the reference OFDM symbol length determined by the second BS, to thereby increase an antenna gain attributed to beamforming and minimize system overhead caused by reference signal transmission in the above example.

In another example, when a commercial district populated with restaurants, coffee shops, etc. co-exists with a highway and a general road within the service coverage (or cell) of a BS, a first user terminal located in the commercial district is highly likely to be stationary or move slowly, whereas a second user terminal in the vicinity of the highway and the general road is highly likely to move fast.

Therefore, the BS will determine different data OFDM symbol lengths $T_s$ and reference OFDM symbol lengths $t_s$ for the first and second user terminals, taking into account the above-described communication characteristics of the first and second user terminals. That is, the reference OFDM symbol lengths $t_s$ are set to be smaller than the data OFDM symbol lengths $T_s$. The data OFDM symbol lengths determined for the first and second user terminals may be equal. However, different reference OFDM symbol lengths may be set for the first and second BSs user terminals. For example, the reference OFDM symbol length determined for the first user terminal may be smaller than the reference OFDM symbol length determined for the second user terminal, to thereby increase an antenna gain attributed to beamforming and minimize system overhead caused by reference signal transmission in the above example.

To implement the above two embodiments of the present invention, a BS needs to notify a user terminal of a frame structure to be used. That is, the BS needs to transmit information about a data OFDM symbol length and a reference OFDM symbol length to the user terminal. Or the BS may transmit only the information about the reference OFDM symbol length to the user terminal.

Instead of directly transmitting the information about the data OFDM symbol length and the reference OFDM symbol length to the user terminal, the BS may transmit to the user terminal implicit information from which the user terminal can determine the data OFDM symbol length and the reference OFDM symbol length. For example, the BS may transmit information about the data OFDM symbol length and information about the number of reference OFDM symbols to be transmitted within the data OFDM symbol length to the user terminal. If the data OFDM symbol length is fixed, the BS may transmit only the information about the reference OFDM symbol length or the number of reference OFDM symbols to the user terminal. If the communication characteristics of a user terminal are not changed across regions, the BS may provide, as system information, information about the data OFDM symbol length and the reference OFDM symbol length or implicit information from which the data OFDM symbol length and the reference OFDM symbol length can be determined, to thereby obviate the need for repeated transmission of the information. Transmission of the information about the data OFDM symbol length is also optional.

Preferred embodiments of the present invention will be described below in detail with reference to the attached drawings.

FIG. 1 illustrates the concept of reference signal transmission in a beam selection procedure in a millimeter wave communication system according to an embodiment of the present invention. In the illustrated case of FIG. 1, the best beam is selected using a plurality of reference signals. The reason for selecting the best beam is to maximize an antenna gain by beamforming in the millimeter wave communication system.

Referring to FIG. 1, a BS 100 transmits as many reference signals as the total number of transmission and reception beam combinations, as indicated by reference numeral 120. The total number of transmission and reception beam combinations is the product between the number of transmission beams of the BS 100 and the number of reception beams of Mobile Stations (MSs) 110, 112 and 114. As many reference signals as the total number of combinations are distinguished by time, frequency, and/or space.

More specifically, each of as many reference signals as the total number of combinations is transmitted and received in a specific transmission/reception beam, that is, by beamforming in a specific direction. Subsequently, each of the MSs 110, 112 and 114 measures the strengths of all received reference signals and selects the best transmission/reception beam combination by comparing the signal strength measurements. That is, the MS selects a signal received from a specific beam direction from among reference signals transmitted in all directions within a sector by beamforming according to the location and topography situation of the MS.

To obtain a higher antenna gain, an antenna array is configured with more antenna elements. If beamforming is applied to the antenna array, the width of a beam formed by each antenna element gets smaller.

Thus, the number of transmission/reception beams is increased to uniformly fill all directions, taking into account narrowed beams. In addition, the resulting increase in the total number of transmission and reception beam combinations linearly increases the number of repeatedly transmitted reference signals. The number of repeatedly transmitted reference signals is equal to that of the total number of transmission and reception beam combinations.

This means that reference signals transmitted at a predetermined interval for beam acquisition occupy more symbols, thus increasing overall system overhead. As a result, overall system capacity is decreased. Accordingly, there exists a need for a method for minimizing the system overhead caused by reference signals during beam acquisition.

Figure 2:
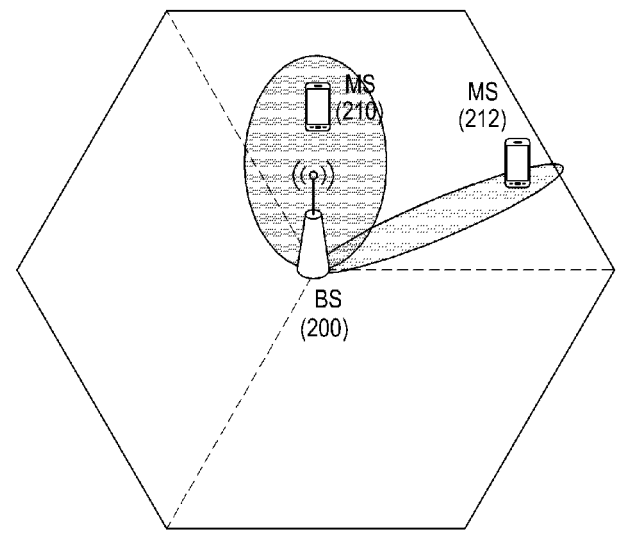
FIG. 2 illustrates the types of beams used for beamforming in the millimeter wave communication system according to an embodiment of the present invention.

FIG. 2 illustrates the types of beams used for beamforming in the millimeter wave communication system according to an embodiment of the present invention. In FIG. 2, a wide beam and a narrow beam are shown for use in beamforming.

In general, the shape and width of a beam are determined according to the number of antenna elements in an antenna array, that is, the number of antenna elements used for beamforming. If beams are formed using more antenna elements, the beams are narrow. On the contrary, if beams are formed using fewer antenna elements, the beams are wide.

The two types of beams, that is, a beam 210 with a large beam width and a beam 212 with a small beam width have their own advantages and shortcomings. For example, it is assumed in FIG. 2 that a BS 200 communicates with a first MS 210 by the wide beam 210 and with a second MS 212 by the narrow beam 212.

In the case of the wide beam 210, all directions can be covered with a relatively small number of beams because one beam can cover a wide area. Due to a small number of beams, the number of repeatedly transmitted reference signals is small. As a result, system overhead is reduced and overall system capacity is increased.

However, the antenna gain is relatively small because a beam is formed to cover a wide area. Moreover, a received signal strength is small due to the small antenna gain, thereby degrading reception performance.

In the case of the narrow beam 212, a signal may be steered in a narrow direction by beamforming using many antenna elements. Therefore, a relatively high antenna gain can be obtained. This means that a strong signal can be received and thus improvement of reception performance can be expected.

However, since one beam can cover only a narrow area, all directions can be covered with a relatively large number of beams. Consequently, more reference signals are needed for beam selection and system overhead is increased, thus decreasing total system capacity.

If the two beam types are flexibly adopted according to a communication environment and a user condition based on the above description, they may be considered as different technologies in the millimeter wave communication system.

Figure 3:
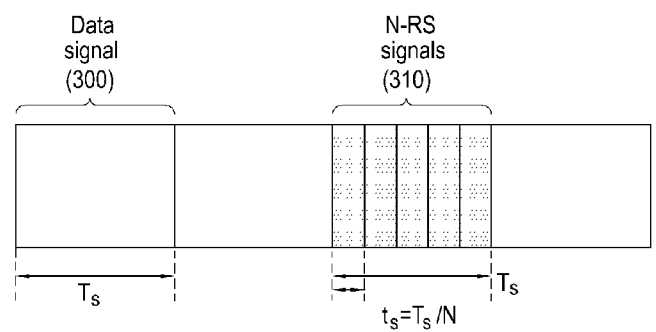
FIG. 3 illustrates the concept of an exemplary signal transmission to reduce system overhead caused by reference signal transmission in the millimeter wave communication system according to an embodiment of the present invention.

FIG. 3 illustrates the concept of an exemplary signal transmission to reduce system overhead caused by reference signal transmission in the millimeter wave communication system according to an embodiment of the present invention.

As illustrated in FIG. 3, a main technical feature of the embodiment of the present invention lies in that different OFDM symbol lengths are used for different transmission signal types. For example, different OFDM symbol lengths are set for a data signal 300 and reference signals 310. If the total OFDM symbol length $T_s$ of N reference signals 310 is equal to the OFDM symbol length $T_s$ of the data signal 300, the OFDM symbol length of one reference signal $t_s$ is $T_s/N$. In other words, the total OFDM symbol length of the N reference signals 310 or the OFDM symbol length of the data signal 300, $T_s$ may be defined as $Nxt_s$.

Because one or more reference signals can be transmitted during one data symbol length, the overall system overhead can be reduced in spite of use of the same number of transmission/reception beams. Herein, a difference in OFDM symbol length is equivalent to a difference in the spacing between adjacent subcarriers on the frequency axis.

That is, a large OFDM symbol length assigned to the data signal 300 means a relatively short spacing between adjacent subcarriers on the frequency axis. In contrast, a small OFDM symbol length assigned to a reference signal 310 relative to that of the data signal 300 means that the spacing between adjacent subcarriers on the frequency axis is relatively large.

Assigning a lot of subcarriers to a reference signal relative to a data signal is an unnecessary reference signal design. Therefore, the best performance can be achieved in terms of beam acquisition performance and system overhead by assigning a small OFDM symbol length and widening the spacing between adjacent subcarriers on the frequency axis in transmitting reference signals.

However, the same-sized guard interval is added before an OFDM symbol irrespective of the data signal 300 and the reference signals 310 because the guard interval is affected by a cell radius. In a cell having a small radius, a signal transmission takes a short time and thus a short guard interval is used. On the other hand, a long guard interval is used in a cell having a large radius in order to prevent interference from an adjacent symbol.

In the embodiment of the present invention, however, different OFDM symbol lengths are applied to the data signal 300 and a reference signal 310, when they are transmitted in the same cell radius. Therefore, the same guard interval is applied.

Figure 4:
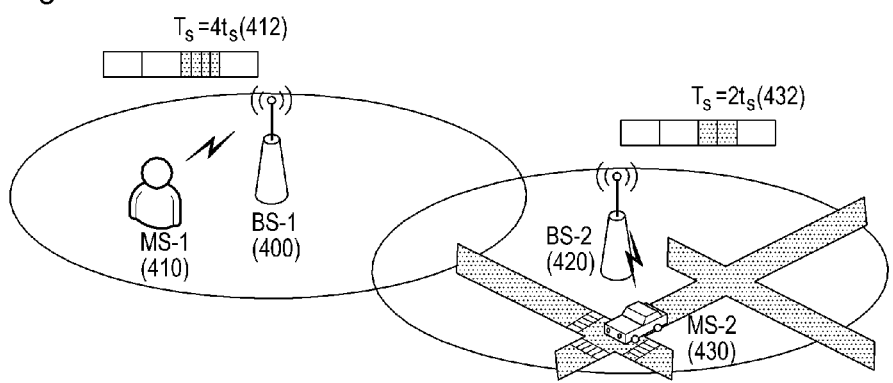
FIG. 4 illustrates an operation scenario in which different cells or Base Stations (BSs) use different Orthogonal Frequency Division Multiplexing (OFDM) symbol lengths for reference signals in the millimeter wave communication system according to an embodiment of the present invention.

FIG. 4 illustrates an operation scenario in which different cells or BSs use different OFDM symbol lengths for reference signals in the millimeter wave communication system according to an embodiment of the present invention. In the illustrated case of FIG. 4, a reference signal having a different OFDM symbol length is used on a cell basis or on a BS basis.

Referring to FIG. 4, first and second MSs 410 and 430 (MS-1 and MS-2) connected respectively to first and second BSs 400 and 420 (BS-1 and BS-2) may differ in communication environment and state depending on the locations and topographies of BS-1 and BS-2.

For example, if BS-1 is installed in a commercial district populated with restaurants, coffee shops, etc., most of MSs connected to BS-1 are highly likely to be stationary or move slowly. On the other hand, if BS-2 is installed in the vicinity of a highway and general road, or a railroad, most of MSs connected to BS-2 are highly likely to move fast. That is, it is typical that MSs attempting communication through BS-2 or MSs connected to BS-2 move fast in most cases.

In the operation scenario illustrated in FIG. 4, BS-1 and BS-2 use different OFDM symbol lengths for reference signals. That is, the OFDM symbol lengths for reference signals are associated with the velocities of MSs connected to the BSs in FIG. 4. Obviously, an operation scenario may be built, in which each BS uses a reference signal having a different OFDM symbol length based on a factor other than the velocity of an MS.

A detailed description will be given below of frames used in BSs connected to MSs having different velocities.

Being installed in an area where MSs are kept almost stationary, for example, in a district populated with restaurants or coffee shops, BS-1 performs beamforming using narrow beams.

It is expected that beams do not change often due to movement of users in an area where MSs scarcely move. That is, if the best transmission/reception beam combination is determined while MSs are almost kept stationary, the probability of changing the determined best transmission/reception beam combination will be very low.

Even though a transmission/reception beam combination supporting narrow beams is selected for MSs located in an area where the MSs scarcely move, the transmission/reception beam combination will not be changed often. Furthermore, beamforming may bring about a high antenna gain owing to the use of narrow beams.

Despite these benefits, the use of narrow beams increases the number of beams or the number of reference signal symbols, thereby increasing overall system overhead. Accordingly, a frame 412 is configured so as to include a relatively large number of reference signal symbols within a data symbol length in order to reduce system overhead according to an embodiment of the present invention.

Being installed in an area where MSs move much or fast, for example, in the vicinity of a road or a railroad where vehicles or trains move fast, BS-2 performs beamforming using wide beams.

It is expected that beams change often due to movement of MSs in an area where the MSs move a lot or fast. That is, if the best transmission/reception beam combination is determined while MSs are moving fast, the probability of changing the determined best transmission/reception beam combination will be very high.

If a transmission/reception beam combination supporting wide beams is selected for MSs located in an area where they move a lot or fast, the transmission/reception beam combination will be changed often. To minimize changing of the selected transmission/reception beam combination, it is preferred to select a transmission/reception beam combination using relatively wide beams. That is, despite a low antenna gain, use of wide beams is efficient.

However, when wide beams are used, the number of beams that uniformly cover all directions is decreased. That is, the number of required reference signals is reduced. Accordingly, a frame 432 is configured so as to include a relatively small number of reference signal symbols within a data symbol length in an embodiment of the present invention.

As described above, BS-1 and BS-2 use the frames 412 and 432 having different configurations according to their locations, i.e. their ambient environments. The ambient environment of a BS represents the movement characteristics of MSs within the service coverage of the BS.

Therefore, each BS needs to notify all MSs within its cell of a frame structure to be used, that is, the type of a frame to be used. For example, each BS broadcasts information about the type of a used frame to MSs within its cell.

The information about the type of a used frame may specify the number of reference signal symbols corresponding to one data symbol. For example, the information about the type of a used frame indicates the number of reference signal symbols included within the length of one data symbol. In another example, the information about the type of a used frame may indicate the index of a symbol pattern to be used from among predetermined symbol patterns. In this case, an MS may determine the number of reference signal symbols that a data symbol length spans based on the index information received from the BS.

Figure 5:
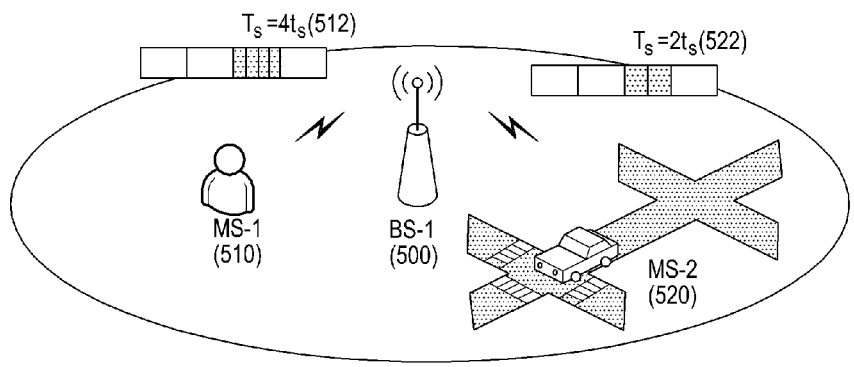
FIG. 5 illustrates an operation scenario in which a cell or BS uses different OFDM symbol lengths for reference signals in the millimeter wave communication system according to another embodiment of the present invention.

FIG. 5 illustrates an operation scenario in which a cell or BS uses different OFDM symbol lengths for reference signals in the millimeter wave communication system according to another embodiment of the present invention. In the illustrated case of FIG. 5, a cell or BS uses reference signals having different OFDM symbol lengths for different MSs according to the conditions and ambient environments of the MSs. Different reference signals are allocated according to user conditions and ambient environments and thus the reference signals may be dedicated to specific users or user groups.

Referring to FIG. 5, first and second MSs 510 and 520 (MS-1 and MS-2) may differ in communication environment and state according to their user conditions and ambient environments in a BS 500 (BS-1) or cell.

For example, it may be predicted that MS-1 is highly likely to be stationary or move slowly a short distance because it is located in a commercial district populated with restaurants and coffee shops. On the other hand, it may be predicted that MS-2 is highly likely to move fast in a vehicle or train because it is located in the vicinity of a highway and general road or a railroad. That is, MSs expected to move fast is typically co-existent with MSs expected to scarcely move among MSs attempting communication through BS-1 or MSs connected to BS-1.

In the embodiment of the present invention illustrated in FIG. 5, dedicated reference signals having different OFDM symbol lengths may be defined according to the conditions and environments of the MSs 510 and 520. In addition, the operation scenario using the dedicated reference signals will be described in relation to different conditions and environments of MSs within the same BS or cell.

In the operation scenario illustrated in FIG. 5, BS-1 uses reference signals having different OFDM symbol lengths for MS-1 and MS-2. That is, OFDM symbol lengths are associated with the velocities of MSs connected to a BS or cell in FIG. 5. Obviously, an operation scenario may be built, in which a BS uses dedicated reference signals having different OFDM symbol lengths for different MSs based on a factor other than the velocities of the MSs.

A detailed description will be given below of frames used for MSs having different velocities, connected to one BS.

Preferably, the BS 500 performs beamforming using a narrow beam for MS-1 located in an area where MSs are kept almost stationary, for example, in a district populated with restaurants or coffee shops.

It is expected that beams do not change often due to movement of users in an area where MSs scarcely move. That is, if the best transmission/reception beam combination is determined while an MS is almost kept stationary, the probability of changing the determined best transmission/reception beam combination will be very low.

Even though a transmission/reception beam combination supporting narrow beams is selected for MSs located in an area where the MSs scarcely move, the transmission/reception beam combination will not be changed often. Furthermore, beamforming may bring about a high antenna gain owing to the use of narrow beams.

Despite these benefits, the use of narrow beams increases the number of beams or the number of dedicated reference signal symbols, thereby increasing overall system overhead. Accordingly, a frame 512 is configured so as to include a relatively large number of dedicated reference signal symbols within a data symbol length in order to reduce system overhead according to an embodiment of the present invention.

Preferably, the BS 500 performs beamforming using wide beams for MS-2 located in an area where MSs move a lot or fast, for example, in the vicinity of a road or a railroad where vehicles or trains move fast.

It is expected that beams change often due to movement of MSs in an area where the MSs move a lot or fast. That is, if the best transmission/reception beam combination is determined while MSs are moving fast, the probability of changing the determined best transmission/reception beam combination will be very high.

If a transmission/reception beam combination supporting a wide beam width is selected for an MS located in an area where MSs move a lot or fast, the transmission/reception beam combination will be changed often. To minimize changing of the selected transmission/reception beam combination, it is preferred to select a transmission/reception beam combination using relatively wide beams. That is, despite a low antenna gain, use of wide beams is efficient.

However, when wide beams are used, the number of beams that uniformly cover all directions is decreased. That is, the number of required dedicated reference signals is reduced. Accordingly, a frame 522 is configured so as to include a relatively small number of dedicated reference signal symbols within a data symbol length in an embodiment of the present invention.

As described above, the BS 500 uses the frames 512 and 5222 having different configurations for different users or user groups. The frame configurations to be used for different users or user groups may be determined according to user conditions such as the ambient environments of the MSs. For example, the ambient environment of an MS includes the velocity of the MS, etc.

Therefore, the BS 500 needs to notify all MSs within its cell of frame structures to be used for the MSs 510 and 520, that is, the types of frames to be used for the MSs 510 and 520. For example, the BS 500 broadcasts information about the types of used frames to MSs within its cell.

The information about the types of used frames may specify the numbers of reference signal symbols corresponding to one data symbol. For example, the information about the types of used frames indicates the numbers of reference signal symbols included within the length of one data symbol. In another example, the information about the types of used frames may indicate the indexes of symbol patterns to be used from among predetermined symbol patterns. In this case, MSs may determine the numbers of reference signal symbols included in a data symbol length based on the index information received from the BS.

Figure 6:
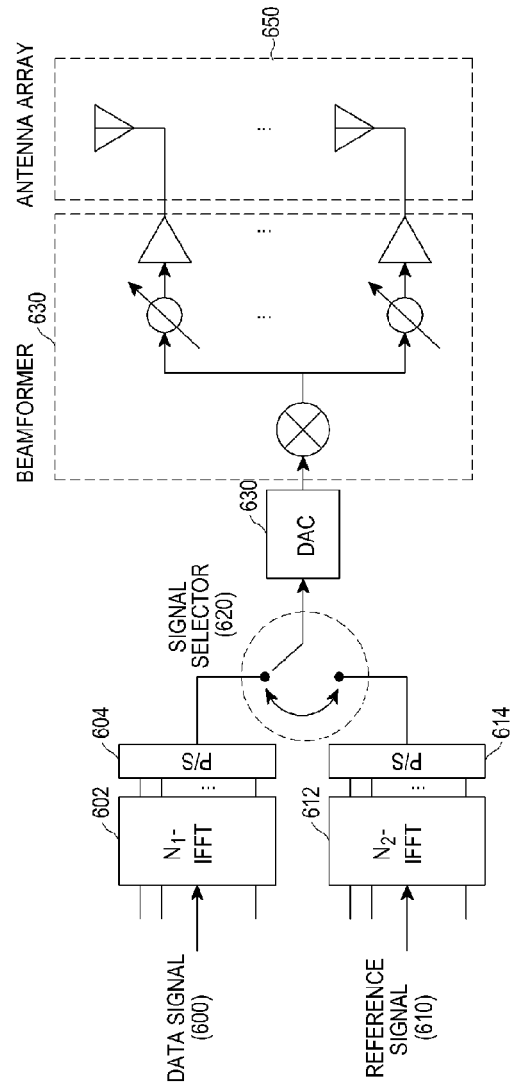
FIG. 6 illustrates a configuration of a transmission apparatus in the millimeter wave communication system according to an embodiment of the present invention.

FIG. 6 illustrates an exemplary configuration of a transmission apparatus in the millimeter wave communication system according to an embodiment of the present invention. That is, the transmission apparatus is configured so as to transmit reference signals having different OFDM symbol lengths for different BSs or different MSs in the afore-described two scenarios.

Referring to FIG. 6, the transmission apparatus includes a modem having a plurality of antenna elements and a transmitter. The transmitter includes a beamformer 640 for forming a beam having a predetermined beam width and an antenna array 650. The modem includes at least two Inverse Fast Fourier Transform (IFFT) processors 602 and 612 corresponding to at least two modulators according to the types of input signals, Parallel/Serial (P/S) converters 604 and 614 corresponding to the at least two IFFT processors 602 and 612, and a Digital to Analog Converter (DAC) 630.

For example, the following description is given on the assumption that two types of signals, a data signal and a reference signal are input. Accordingly, different OFDM symbol lengths are used for transmitting the data signal and the reference signal. That is, the data signal and the reference signal are transmitted with different spacings between adjacent subcarriers on the frequency axis, which can be implemented using different IFFT/FFT sizes.

A data signal 600 is provided to the $N_1$ IFFT processor 602, and a reference signal 610 is provided to the $N_2$ IFF processor 612. $N_1$ and $N_2$ are IFFT sizes and $N_1$ is equal to or larger than $N_2$.

The $N_1$ IFFT processor 602 converts the input data signal in the frequency domain to a data signal in the time domain by IFFT. The $N_2$ IFFT processor 612 converts the input reference signal in the frequency domain to a reference signal in the time domain by IFFT. The $N_1$ IFFT processor 602 and $N_2$ IFFT processor 612 have different IFFT sizes, $N_1$ and $N_2$.

The reason for applying different IFFT sizes within the same bandwidth to the data signal 600 and the reference signal 610 is to differentiate an OFDM symbol length according to the type of a signal to be transmitted during the same time period. That is, the time-domain data signal (hereinafter, referred to as a 'data OFDM symbol sequence') output from the $N_1$ IFF processor 602 and the time-domain reference signal (hereinafter, referred to as a 'reference OFDM symbol sequence') output from the $N_2$ IFF processor 612 become OFDM symbols having different lengths. For example, one data OFDM symbol length $T_s$ may be equal to the total length $Nxt_s$ of five (N=5) reference OFDM symbols. This means to assume that the data signal 600 and the reference signal 610 are transmitted with different subcarrier spacings.

Meanwhile, the first P/S converter 604 converts parallel data OFDM symbol sequences received from the $N_1$ IFF processor 602 to a serial signal, whereas the second P/S converter 614 converts parallel reference OFDM symbol sequences received from the $N_2$ IFF processor 604 to a serial signal.

A signal selector 620 receives the serial data OFDM symbol sequence from the first P/S converter 604 and the serial reference OFDM symbol sequence from the second P/S converter 614.

The signal selector 620 selects as many OFDM symbols as intended from the data OFDM symbol sequence received from the first P/S converter 604 and the reference OFDM symbol sequence received from the second P/S converter 614 according to a predetermined symbol selection condition. That is, the signal selector 620 selectively outputs a data OFDM symbol and a reference OFDM symbol according to frame structures to be used for transmission of a data signal and a reference signal.

For example, on the assumption that an OFDM symbol length applied to transmission of a data signal, $T_s$ is an N multiple of an OFDM symbol length applied to transmission of a reference signal, $t_s$, when outputting reference OFDM symbols, the signal selector 620 outputs N reference OFDM symbols during the time period $T_s$. In contrast, when outputting data OFDM symbols, the signal selector 620 outputs one data OFDM symbol during the time period $T_s$.

The two embodiments of the present invention have been proposed above. That is, one of the embodiments has been described with reference to FIG. 4 and the other embodiment has been described with reference to FIG. 5. Therefore, the signal selector 620 of the transmission apparatus may perform a different operation according to a supported embodiment, that is, may selectively use a symbol selection condition for symbol selection according to a supported embodiment.

*For example, in the embodiment of the present invention illustrated in FIG. 4, a symbol selection condition to be referred to by the signal selector 620 may be defined based on a frame structure specific to each BS. In contrast, in the embodiment of the present invention illustrated in FIG. 5, a symbol selection condition to be referred to by the signal selector 620 may be defined based on a frame structure specific to each MS.

In the former embodiment, the signal selector 620 determines the type of an OFDM symbol to be output according to a data signal transmission period or a reference signal transmission period and selects one of data and reference OFDM symbols according to the OFDM symbol type. When outputting the selected OFDM symbol, the signal selector 620 considers an OFDM symbol length to be applied. For example, on the assumption that an OFDM symbol length applied to transmission of a data signal, $T_s$ is an N multiple of an OFDM symbol length applied to transmission of a reference signal, $t_s$, when outputting reference OFDM symbols, the signal selector 620 outputs N reference OFDM symbols during the time period $T_s$. In contrast, when outputting data OFDM symbols, the signal selector 620 outputs one data OFDM symbol during the time period $T_s$.

In the latter embodiment, the signal selector 620 determines the type of an OFDM symbol to be output according to a data signal transmission period or a reference signal transmission period and selects one of data and reference OFDM symbols according to the OFDM symbol type. When outputting the selected OFDM symbol, the signal selector 620 considers an OFDM symbol length to be applied, based on the location of an MS. That is, reference signals are transmitted in different-length OFDM symbols to MSs according to the conditions and environments of the MSs.

For example, N is set to 2 within one data OFDM symbol length (the frames 432 and 522) for the MSs 430 and 520 in an area where fast movement is expected, whereas N is set to 4 within one data OFDM symbol length (the frames 412 and 512) for the MSs 410 and 510 in an area where little movement is expected. N is the number of reference OFDM symbols to be transmitted during a transmission period (i.e. one data OFDM symbol length). That is, the signal selector 620 selects two reference OFDM symbols for the MSs 430 and 520 in the area where fast movement is expected during the same time period ($T_s=2t_s$). On the other hand, the signal selector 620 selects four reference OFDM symbols for the MSs 412 and 512 in the area where little movement is expected during the same period ($T_s=4t_s$).

The DAC 630 converts an OFDM symbol received from the signal selector 620 to an analog signal and outputs the analog signal to the beamformer 640. The beamformer 640 allocates a beam having a predetermined width to each region segmented from a cell. For example, the beam width may be set according to a similar condition to that used in determining a frame structure. That is, beamforming is performed with a large beam width for an area where fast or frequent movement is expected, and with a small beam width for an area where little movement is expected.

For example, the width of a beam that covers the area where fast movement is expected and thus to which two reference OFDM symbols will be transmitted during the same time period $T_s$ is set to be larger than that of a beam that covers the area where little movement is expected and thus to which four reference OFDM symbols will be transmitted during the same time period $T_s$. That is, beams carrying a large number of reference OFDM symbols during the same time period $T_s$ are set to be wide, while beams carrying a small number of reference OFDM symbols during the same time period $T_s$ are set to be narrow.

The beamformer 640 provides a beamforming pattern determined according to the above rule to the antenna array 650. The antenna array 650 generates an OFDM frame with the data signal and the reference signal in the beamforming pattern.

Figure 7:
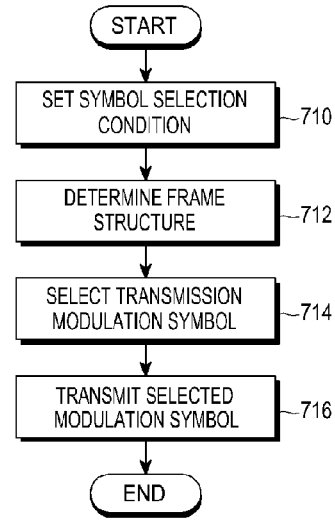
FIG. 7 is a flowchart illustrating a control operation for transmitting a signal at the transmission apparatus in the millimeter wave communication system according to an embodiment of the present invention.

FIG. 7 is a flowchart illustrating a control operation for transmitting a signal at the transmission apparatus in the millimeter wave communication system according to an embodiment of the present invention. The control operation of FIG. 7 includes setting a data modulation symbol length and a reference modulation symbol length (steps 710 to 714) and transmission of a data modulation symbol and a reference modulation symbol (step 716).

Referring to FIG. 7, the transmission apparatus sets a symbol selection condition based on the communication characteristics of an MS in step 710. For example, the symbol selection condition is set according to the communication characteristics of the MS such as velocity or movement probability. That is, a relatively small reference modulation symbol length is set for an MS expected to move little or slowly, relative to an MS expected to move fast or frequently. Further, the symbol selection condition may be defined for a data modulation symbol length.

The transmission apparatus determines a frame structure to be used for transmitting a signal including a data signal and a reference signal based on the set symbol selection condition in step 712. For example, the transmission apparatus defines a data modulation symbol period and a reference modulation symbol period in a frame according to the set symbol selection condition. In addition, the transmission apparatus may determine the number of reference modulation symbols to be transmitted during the reference modulation symbol period according to the symbol selection condition.

The transmission apparatus selects a modulation symbol to be transmitted according to the determined frame structure in step 714. For example, a data OFDM symbol generated by OFDM modulation is selected in the data modulation symbol period, while as many reference OFDM symbols generated by OFDM modulation as the determined number are selected in the reference modulation symbol period.

The transmission apparatus determines a beamforming pattern based on the communication characteristics of the MS, or the data and reference modulation symbol lengths in step 716. The transmission apparatus then transmits the selected modulation symbol, that is, the data modulation symbol or the reference modulation symbols according to the determined beamforming pattern.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A method for transmitting a signal by a transmission apparatus in a wireless communication system supporting communication in a high frequency band, the method comprising:
identifying a number of reference modulation symbols to transmit and a reference modulation symbol length;
transmitting a data modulation symbol generated by modulating a data signal using a first modulation scheme, according to a data modulation symbol length; and
transmitting reference modulation symbols generated by modulating a reference signal using a second modulation scheme, according to the identified number and the identified reference modulation symbol length,
wherein the identified reference modulation symbol length is shorter than the data modulation symbol length, and the number of reference modulation symbols can be determined based on the data modulation symbol length.

2. The method of claim 1, wherein:
the data modulation symbol length and the reference modulation symbol length are determined based on a communication characteristic of a mobile station (MS), and
the communication characteristic of the MS is determined by a communication environment of a base station (BS) having the transmission apparatus or a communication environment of the MS connected to the BS.

3. The method of claim 2, wherein the identifying a number of reference modulation symbols and the reference modulation symbol length comprises, if the communication characteristic of the MS is determined by a velocity of the MS, determining a small reference modulation symbol length for a MS expected to move slowly, relative to a reference modulation symbol length for a MS expected to move quickly.

4. The method of claim 2, wherein the identifying a number of reference modulation symbols and the reference modulation symbol length comprises, if the communication characteristic of the MS is determined by a velocity of the MS, determining a small reference modulation symbol length for a BS connected to MSs expected to move slowly, relative to a reference modulation symbol length for a BS connected to MSs expected to move quickly.

5. The method of claim 1, further comprising transmitting information about the reference modulation symbol length to a connectable mobile station (MS).

6. The method of claim 1, wherein the data modulation symbol length is an integer multiple of the reference modulation symbol length.

7. The method of claim 6, further comprising determining different reference modulation symbol lengths for different base stations (BSs) or determining different reference modulation symbol lengths for beams having a plurality of beam widths corresponding to segments of a service area of one BS.

8. The method of claim 3, wherein the transmission of the reference modulation symbol comprises beamforming a reference modulation symbol with a small beam width for the MS expected to move slowly, relative to a width of a reference modulation symbol for the MS expected to move quickly.

9. The method of claim 1, wherein the first modulation scheme and the second modulation scheme is a orthogonal frequency division multiplexing (OFDM) modulation.

10. A transmission apparatus for transmitting a signal in a wireless communication system supporting communication in a super-high frequency band, the transmission apparatus comprising:
a modulator configured to generate a data modulation symbol by modulating a data signal using a first modulation scheme, according to a data modulation symbol length, and to generate reference modulation symbols by modulating a reference signal using a second modulation scheme, according to a reference modulation symbol length;
a controller configured to identify a number of the reference modulation symbols to transmit and the reference modulation symbol length; and
a transmitter configured to transmit the generated data modulation symbol and the generated reference modulation symbols of the identified number,
wherein the identified reference modulation symbol length is shorter than the data modulation symbol length, and the number of reference modulation symbols can be determined based on the data modulation symbol length.

11. The transmission apparatus of claim 10, wherein:
the data modulation symbol length and the reference modulation symbol length are determined based on a communication characteristic of the MS, and
the communication characteristic of the MS is determined by a communication environment of a base station (BS) having the transmission apparatus or a communication environment of the MS connected to the BS.

12. The transmission apparatus of claim 11, wherein if the communication characteristic of the MS is determined by a velocity of the MS, the controller is configured to determine a small reference modulation symbol length for a MS expected to move slowly, relative to a reference modulation symbol length for a MS expected to move quickly.

13. The transmission apparatus of claim 11, wherein if the communication characteristic of the MS is determined by a velocity of the MS, the controller is configured to determine a small reference modulation symbol length for a BS connected to MSs expected to move slowly, relative to a reference modulation symbol length for a BS connected to MSs expected to move quickly.

14. The transmission apparatus of claim 10, wherein the transmitter is configured to transmit information about the determined reference modulation symbol length to a connectable mobile station (MS).

15. The transmission apparatus of claim 10, wherein the data modulation symbol length is an integer multiple of the reference modulation symbol length.

16. The transmission apparatus of claim 15, wherein the controller is configured to determine different reference modulation symbol lengths for different BSs or determines different reference modulation symbol lengths for beams having a plurality of beam widths corresponding to segments of a service area of one base station (BS).

17. The transmission apparatus of claim 12, wherein the transmitter comprises a beamformer configured to beamform a reference modulation symbol with a small beam width for the MS expected to move slowly, relative to a width of a reference modulation symbol for the MS expected to move quickly.

18. The transmission apparatus of claim 10, wherein the first modulation scheme and the second modulation scheme is a orthogonal frequency division multiplexing (OFDM) modulation.

19. The transmission apparatus of claim 13, wherein the transmitter comprises a beamformer configured to beamform a reference modulation symbol with a small beam width for the MS expected to move slowly, relative to a width of a reference modulation symbol for the MS expected to move quickly.

20. The method of claim 4, wherein the transmission of the reference modulation symbol comprises beamforming a reference modulation symbol with a small beam width for the MS expected to move slowly, relative to a width of a reference modulation symbol for the MS expected to move quickly.

21. The method of claim 1, wherein the data modulation symbol is transmitted during a predetermined time period, and the reference modulation symbols of the identified number is transmitted during the predetermined time period.

22. The transmission apparatus of claim 10, wherein the transmitter is configured to transmit the data modulation symbol during a predetermined time period, and to transmit the reference modulation symbols of the identified number during the predetermined time period.

\* \* \* \* \*